United States Patent
Morishima et al.

(10) Patent No.: US 11,247,417 B2
(45) Date of Patent: Feb. 15, 2022

(54) COMPOSITE MATERIAL MEMBER, GAP MATERIAL, PULTRUSION DEVICE, AND PULTRUSION METHOD

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 363 days.

(21) Appl. No.: 16/313,089

(22) PCT Filed: Jul. 14, 2017

(86) PCT No.: PCT/JP2017/025824
§ 371 (c)(1),
(2) Date: Dec. 24, 2018

(87) PCT Pub. No.: WO2018/037767
PCT Pub. Date: Mar. 1, 2018

(65) Prior Publication Data
US 2019/0160763 A1    May 30, 2019

(30) Foreign Application Priority Data
Aug. 22, 2016  (JP) .............................. JP2016-161886

(51) Int. Cl.
*B29C 70/52*    (2006.01)
*B29D 99/00*    (2010.01)
(Continued)

(52) U.S. Cl.
CPC ............ *B29C 70/52* (2013.01); *B29C 70/205* (2013.01); *B29C 70/24* (2013.01); *B29C 70/682* (2013.01);
(Continued)

(58) Field of Classification Search
CPC ....... B29C 70/52; B29C 70/205; B29C 70/24; B29C 70/682; B29C 66/301;
(Continued)

(56) References Cited

U.S. PATENT DOCUMENTS 4,331,723 A * 5/1982 Hamm ................. B29C 70/865
428/61
4,789,594 A * 12/1988 Stawski ................... B26D 1/02
156/222

(Continued)

FOREIGN PATENT DOCUMENTS

EP    2556947 A2    2/2013
EP    2907652 A2    8/2015
(Continued)

OTHER PUBLICATIONS

Extended European Search Report for European Application No. 17843254.8 dated Jul. 25, 2019; 8pp.

(Continued)

*Primary Examiner* — Cynthia L Schaller
(74) *Attorney, Agent, or Firm* — Hauptman Ham, LLP

(57) ABSTRACT

This pultrusion material that is a composite material member comprises: a plurality of fiber sheets that extend along a lengthwise direction; and a gap material that is provided to a gap formed by the plurality of fiber sheets, wherein the gap material has a gap fiber sheet including reinforcement fibers that are oriented in a different fiber direction than the lengthwise direction, and has gap reinforcement fibers that are oriented in the same fiber direction as the lengthwise (Continued)

direction. Additionally, the gap reinforcement fibers are provided evenly distributed in a cross-section of the gap material, said cross-section being perpendicular to the lengthwise direction.

7 Claims, 5 Drawing Sheets

(51) Int. Cl.
    *B29C 70/20*     (2006.01)
    *B29C 70/24*     (2006.01)
    *B29C 70/68*     (2006.01)
    *B29K 63/00*     (2006.01)
    *B29K 71/00*     (2006.01)
    *B29K 81/00*     (2006.01)
    *B29K 307/04*     (2006.01)
    *B29K 309/08*     (2006.01)

(52) U.S. Cl.
    CPC ...... *B29D 99/0003* (2013.01); *B29K 2063/00* (2013.01); *B29K 2071/00* (2013.01); *B29K 2081/04* (2013.01); *B29K 2307/04* (2013.01); *B29K 2309/08* (2013.01)

(58) Field of Classification Search
    CPC ............ B29D 99/0003; B29K 2063/00; B29K 2071/00; B29K 2081/04; B29K 2307/04; B29K 2309/08; B32B 5/02
    USPC .......................................................... 428/61
    See application file for complete search history.

(56) References Cited

U.S. PATENT DOCUMENTS

| | | | | |
|---|---|---|---|---|
| 7,534,319 | B2* | 5/2009 | Mead | B32B 7/12 |
| | | | | 156/259 |
| 8,940,119 | B2 | 1/2015 | Hanawa et al. | |
| 9,855,702 | B1* | 1/2018 | Olberg | B29C 48/06 |
| 2002/0014302 | A1* | 2/2002 | Fanucci | B32B 37/22 |
| | | | | 156/179 |
| 2015/0283764 | A1* | 10/2015 | McCarville | B29D 99/0003 |
| | | | | 428/161 |
| 2016/0144558 | A1 | 5/2016 | Vetter et al. | |
| 2016/0271890 | A1* | 9/2016 | Rihei | B29C 43/305 |

FOREIGN PATENT DOCUMENTS

| | | | |
|---|---|---|---|
| EP | 3081370 | A1 | 10/2016 |
| JP | 2002307585 | A | 10/2002 |
| JP | 3549271 | B2 | 8/2004 |
| JP | 2007154535 | A | 6/2007 |
| WO | 2011046137 | A1 | 4/2011 |

OTHER PUBLICATIONS

International Search Report and Written Opinion for International Application No. PCT/JP2017/025824 dated Sep. 26, 2017; 37pp.

* cited by examiner

COMPOSITE MATERIAL MEMBER, GAP MATERIAL, PULTRUSION DEVICE, AND PULTRUSION METHOD

RELATED APPLICATIONS

The present application is a National phase of International Application Number PCT/JP2017/025824, filed on Jul. 14, 2017, and claims priority to Japanese Application No. 2016-161886, filed on Aug. 22, 2016.

TECHNICAL FIELD

The present invention relates to composite material member which is formed by pultrusion, a gap material, a pultrusion device, and a pultrusion method.

BACKGROUND ART

In the related art, a method of manufacturing a beam material in which a wedge-shaped void which is formed in a branch portion between a plurality of reinforcement fiber base materials configuring the beam material is filled with a filler formed body is known (refer to, for example, PTL 1). The filler formed body is formed using a filler material composed of reinforcement fibers.

CITATION LIST

Patent Literature

[PTL 1] International Publication No. WO2011/046137

SUMMARY OF INVENTION

Technical Problem

Here, the reinforcement fibers which are included in a gap material such as the filler formed body which is filled into the void are generally provided such that a fiber direction thereof is along a longitudinal direction of the beam material. In a case where the fiber direction of the reinforcement fiber which is included in the filler formed body is in the longitudinal direction of the beam material, if a load such as a shearing force, for example, acts in a direction orthogonal to the longitudinal direction, the load acts in a direction in which the reinforcement fibers are separated from each other. For this reason, there is a possibility that a defect such as cracking may occur in the filler formed body.

Therefore, the present invention has an object to provide a composite material member, a gap material, a pultrusion device, and a pultrusion method, in which it is possible to improve the strength of the gap material against a load.

Solution to Problem

According to an aspect of the present invention, there is provided a composite material member including: a plurality of fiber sheets extending along a longitudinal direction; and a gap material which is provided in a gap formed by the plurality of fiber sheets, in which the gap material includes a gap fiber sheet which includes reinforcement fibers oriented in a fiber direction different from the longitudinal direction, and gap reinforcement fibers oriented in the same fiber direction as the longitudinal direction.

Further, according to another aspect of the present invention, there is provided a gap material which is provided in a gap of a composite material member formed by a plurality of fiber sheets extending along a longitudinal direction, the gap material including: a gap fiber sheet which includes reinforcement fibers oriented in a fiber direction different from the longitudinal direction; and gap reinforcement fibers oriented in the same fiber direction as the longitudinal direction.

According to these configurations, the gap material includes the gap fiber sheet in addition to the gap reinforcement fibers, and therefore, even in a case where a load acts in a direction in which the gap reinforcement fibers are separated from each other, the reinforcement fibers included in the gap fiber sheet provides drag, so that the gap material can be reinforced. Accordingly, the strength of the gap material against the load can be improved, and therefore, occurrence of a defect such as cracking can be suppressed. As the gap fiber sheet, for example, a nonwoven fabric such as felt in which short fibers are entangled (in random directions), a laminated fiber sheet in which a plurality of fiber sheets are laminated such that fiber directions are multi-directional, by isotropic lamination or the like, or a multiaxially oriented fiber sheet in which fiber directions are multiaxially oriented in one sheet can be used.

Further, it is preferable that the gap reinforcement fibers are provided to be evenly distributed in a cross section of the gap material, which is orthogonal to the longitudinal direction.

According to this configuration, uneven distribution of the gap reinforcement fibers in the cross section of the gap material can be suppressed, and therefore, it is possible to suppress the gap reinforcement fibers from being adjacent to each other and suppress occurrence of a defect between the gap reinforcement fibers.

Further, it is preferable that the gap reinforcement fibers are provided in contact with at least one surface of the gap fiber sheet and the gap material is formed by bending the gap fiber sheet in which the gap reinforcement fibers are in contact with one surface thereof.

According to this configuration, the gap reinforcement fibers can be disposed to be easily and evenly distributed in the cross section of the gap material, which is orthogonal to the longitudinal direction.

Further, it is preferable that a plurality of the gap fiber sheets are provided and the gap material is formed by laminating the plurality of gap fiber sheets and disposing the gap reinforcement fibers between the laminated gap fiber sheets.

According to this configuration, the gap reinforcement fibers can be disposed to be easily and evenly distributed in the cross section of the gap material, which is orthogonal to the longitudinal direction.

According to still another aspect of the present invention, there is provided a pultrusion device for pultruding a composite material member which includes a plurality of fiber sheets drawn in a drawing direction, the pultrusion device including: a preliminary molding tool which preliminarily molds a gap material which is provided in a gap formed by the plurality of fiber sheets drawn in the drawing direction, in which the gap material includes a gap fiber sheet which includes reinforcement fibers oriented in a fiber direction different from the drawing direction, and gap reinforcement fibers oriented in the same fiber direction as the drawing direction, and the preliminary molding tool preliminarily molds the gap material by causing the gap reinforcement fibers and the gap fiber sheet to be drawn along the drawing direction.

Further, according to still yet another aspect of the present invention, there is provided a pultrusion method of pultruding a composite material member while drawing a plurality of fiber sheets in a drawing direction, the pultrusion method including: a gap material preliminary molding step of preliminarily molding a gap material which is provided in a gap formed by the plurality of fiber sheets which is drawn in the drawing direction, in which the gap material includes a gap fiber sheet which includes reinforcement fibers oriented in a fiber direction different from the drawing direction, and gap reinforcement fibers oriented in the same fiber direction as the drawing direction, and in the gap material preliminary molding step, the gap reinforcement fibers and the gap fiber sheet are drawn along the drawing direction, whereby the gap material is preliminarily molded.

According to these configurations, the gap material includes the gap fiber sheet in addition to the gap reinforcement fibers, and therefore, even in a case where a load acts in a direction in which the gap reinforcement fibers are separated from each other, the reinforcement fibers included in the gap fiber sheet provides drag, so that the gap material can be reinforced. Accordingly, the strength of the gap material against the load can be improved, and therefore, occurrence of a defect such as cracking can be suppressed.

Further, it is preferable that the preliminary molding tool preliminarily molds the gap material by disposing the gap reinforcement fibers so as to be in contact with at least one surface of the gap fiber sheet and bending the gap fiber sheet in which the gap reinforcement fibers are in contact with one surface thereof.

Further, it is preferable that in the gap material preliminary molding step, the gap material is preliminarily molded by disposing the gap reinforcement fibers so as to be in contact with at least one surface of the gap fiber sheet and bending the gap fiber sheet in which the gap reinforcement fibers are in contact with one surface thereof.

According to these configurations, the gap reinforcement fibers can be disposed to be easily and evenly distributed in the cross section of the gap material, which is orthogonal to the drawing direction.

Further, it is preferable that the preliminary molding tool preliminarily molds the gap material by laminating a plurality of the gap fiber sheets and disposing the gap reinforcement fibers between the laminated gap fiber sheets.

Further, it is preferable that in the gap material preliminary molding step, the gap material is preliminarily molded by laminating a plurality of the gap fiber sheets and disposing the gap reinforcement fibers between the laminated gap fiber sheets.

According to these configurations, the gap reinforcement fibers can be disposed to be easily and evenly distributed in the cross section of the gap material, which is orthogonal to the drawing direction.

DESCRIPTION OF EMBODIMENTS

Hereinafter, embodiments of the present invention will be described in detail based on the drawings. The present invention is not limited by the embodiments. Further, constituent elements that can be easily replaced by those skilled in the art, or constituent elements that are substantially identical to the constituent elements in the following embodiments are included in the constituent elements in the following embodiments. Further, the constituent elements described below can be appropriately combined, and in a case where there are a plurality of embodiments, it is also possible to combine the respective embodiments.

Embodiment 1

Figure 1:
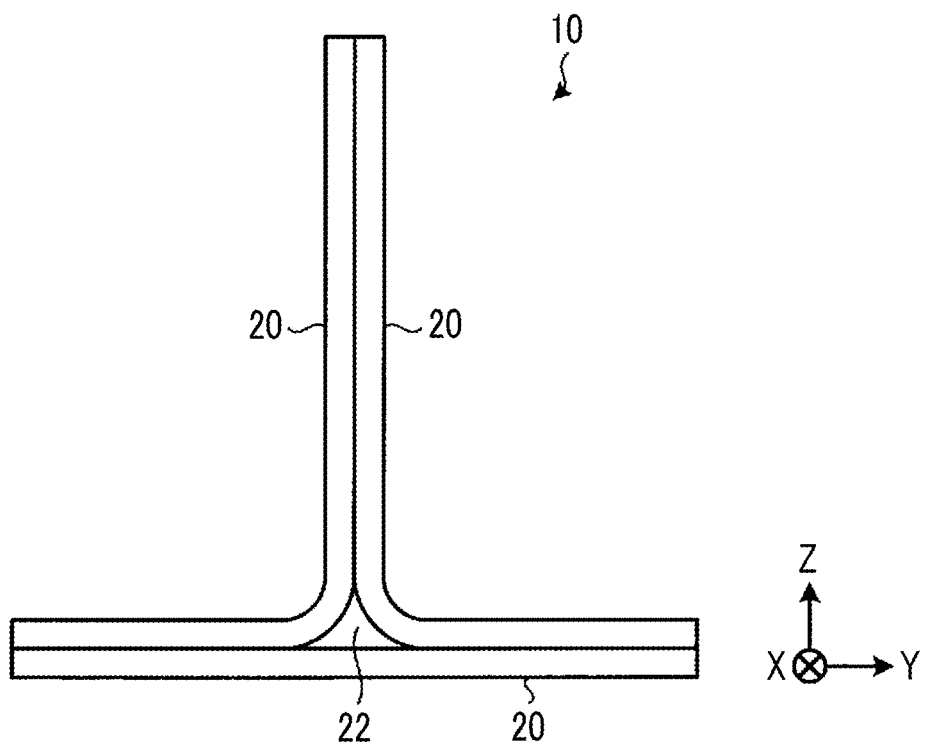
FIG. 1 is a sectional view schematically showing an example of a composite material member according to Embodiment 1.
Figure 2:
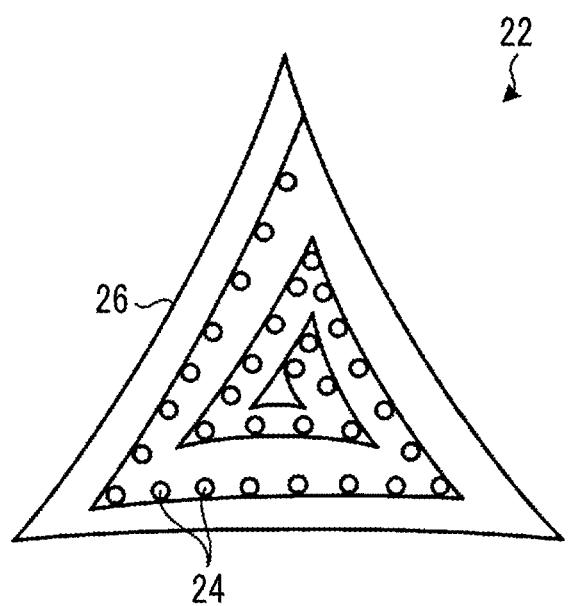
FIG. 2 is a sectional view schematically showing a gap material which is provided in the composite material member according to Embodiment 1.
Figure 3:
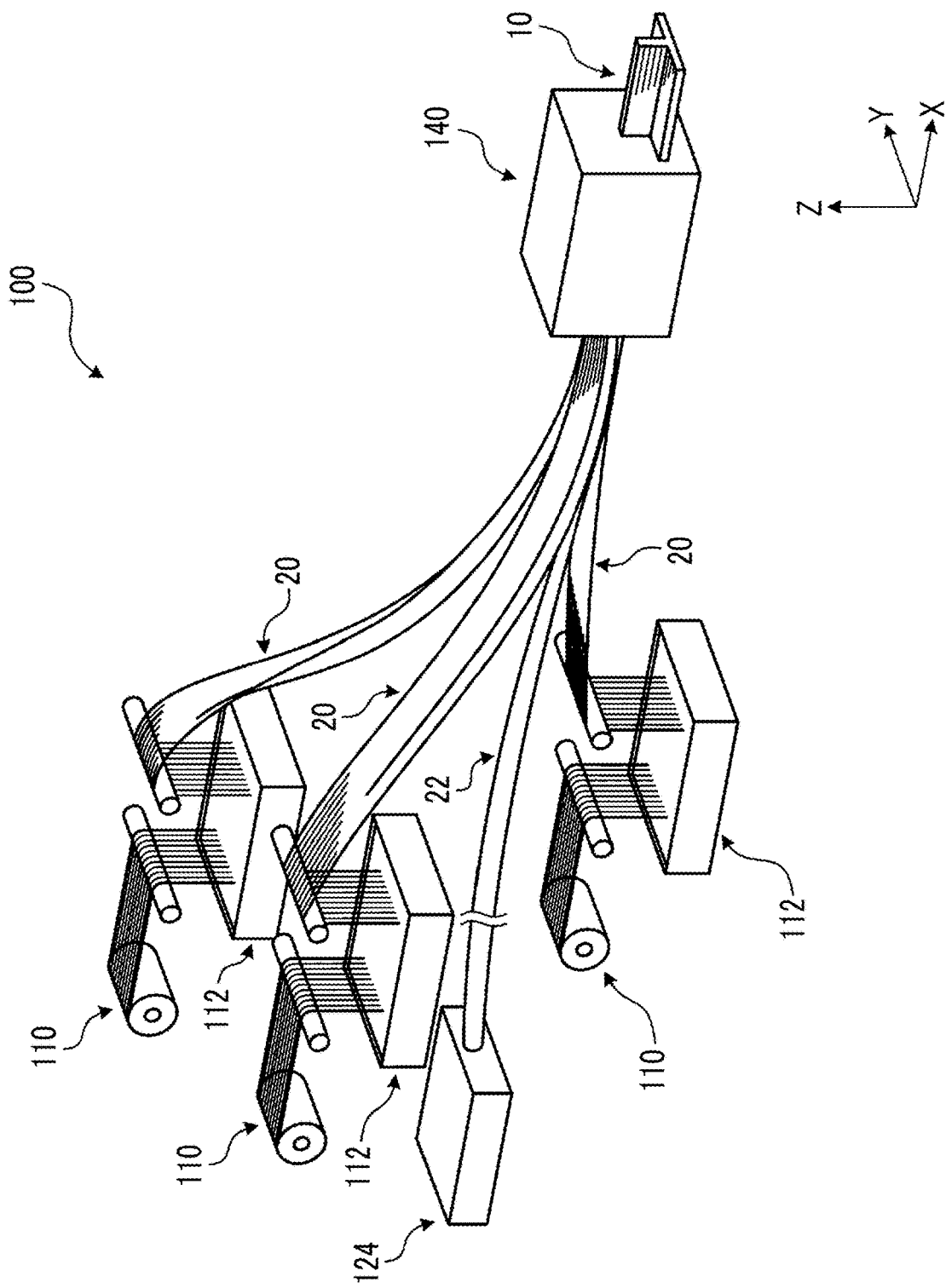
FIG. 3 is a schematic configuration diagram showing an example of a pultrusion device according to Embodiment 1.
Figure 4:
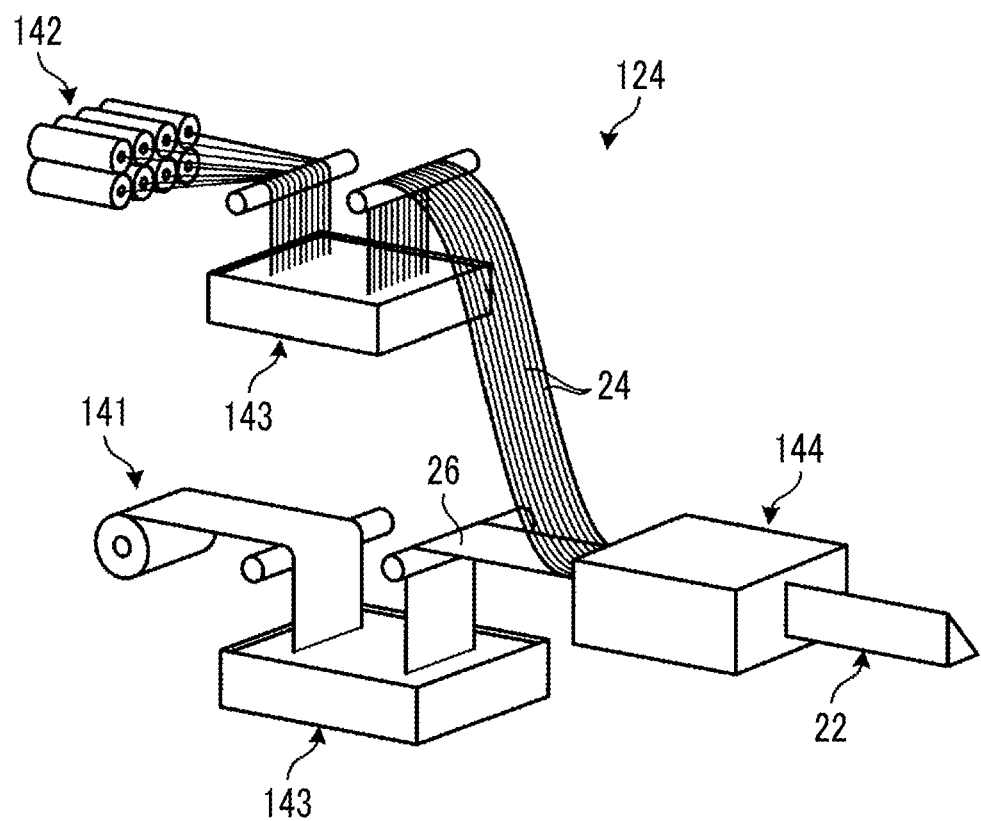
FIG. 4 is a schematic configuration diagram showing an example of a gap material supply unit of the pultrusion device according to Embodiment 1.
Figure 5:
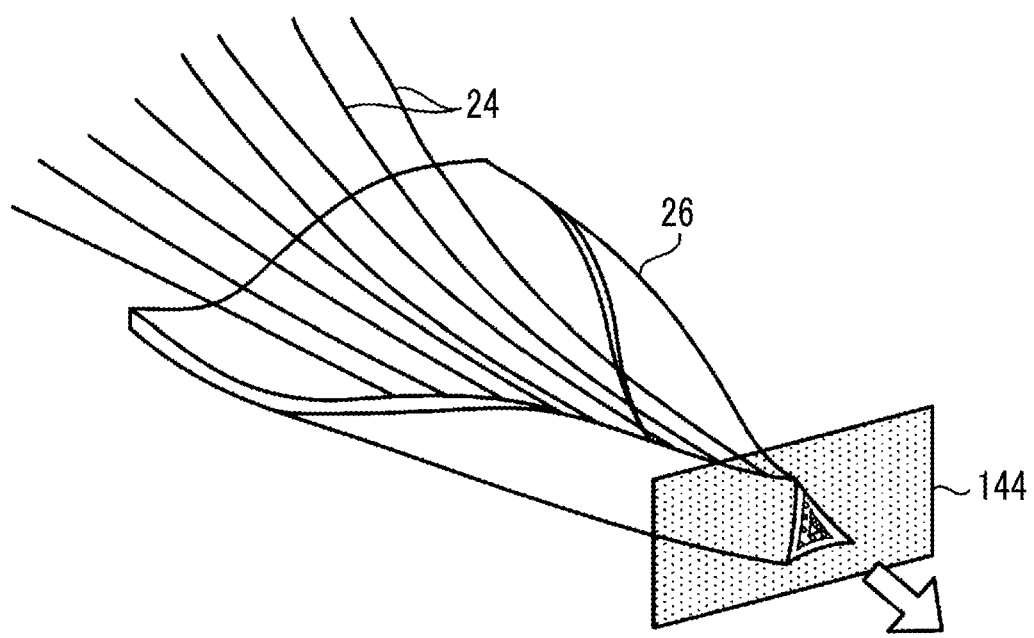
FIG. 5 is a schematic configuration diagram showing the surroundings of a preliminary molding tool of the pultrusion device according to Embodiment 1.
Figure 6:
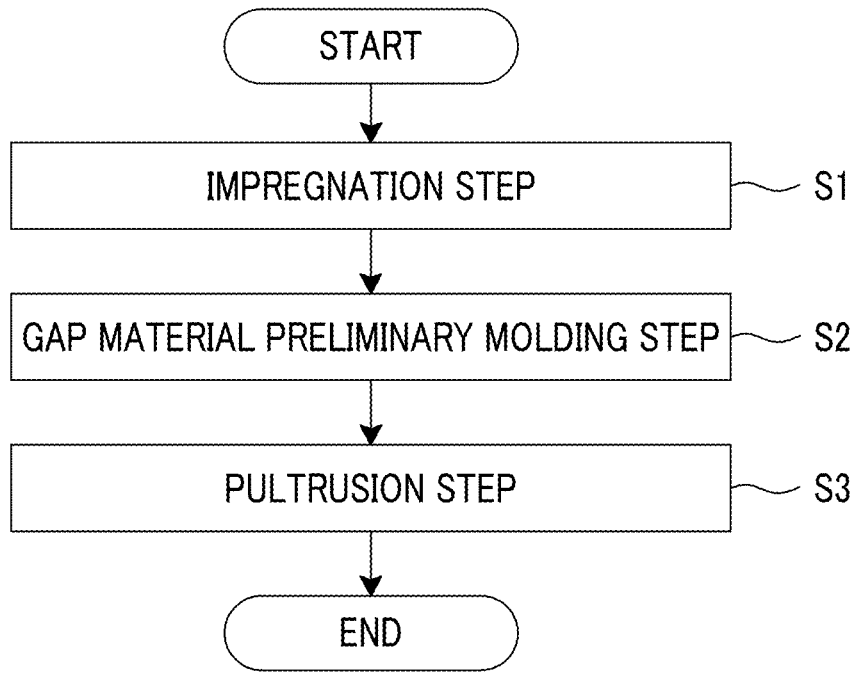
FIG. 6 is a flowchart relating to a pultrusion method according to Embodiment 1.

FIG. 1 is a sectional view schematically showing an example of a composite material member according to Embodiment 1. FIG. 2 is a sectional view schematically showing a gap material which is provided in the composite material member according to Embodiment 1. FIG. 3 is a schematic configuration diagram showing an example of a pultrusion device according to Embodiment 1. FIG. 4 is a schematic configuration diagram showing an example of a gap material supply unit of the pultrusion device according to Embodiment 1. FIG. 5 is a schematic configuration diagram showing the surroundings of a preliminary molding tool of the pultrusion device according to Embodiment 1. FIG. 6 is a flowchart relating to a pultrusion method according to Embodiment 1.

The composite material member according to Embodiment 1 is a pultrusion material 10 pultruded along a longitudinal direction which is an X-axis direction shown in FIG. 1, and has a shape extending in the X-axis direction. The pultrusion material 10 is formed in a predetermined shape in a Y-Z plane shown in FIG. 1, that is, in a cross section orthogonal to the longitudinal direction. In Embodiment 1, the pultrusion material 10 is formed in a T shape in a cross section thereof. However, there is no limitation thereto, and the pultrusion material 10 may be formed in any shape such as an I shape, an H shape, a concave shape, and a cylindrical shape.

The pultrusion material 10 includes a plurality of fiber sheets 20 and a gap material 22, as shown in FIG. 1. The plurality of fiber sheets 20 are each formed in a sheet shape extending in the X-axis direction and are deformed such that a predetermined shape (a T shape in FIG. 1) is deformed in the Y-Z plane, at the time of pultrusion. The fiber sheet 20 is a composite material which includes reinforcement fibers and thermosetting resin impregnated in the reinforcement fibers. For each fiber sheet 20, for example, a fiber sheet is used in which a plurality of layers of reinforcement fibers oriented in a predetermined fiber direction are laminated and fiber directions are multi-directional such that the fiber directions in the respective layers are different from each other. Here, in Embodiment 1, as the reinforcement fibers, for example, carbon fibers are applied. However, there is no limitation to the carbon fibers, and glass fibers or the like may also be applied. Further, in Embodiment 1, as the thermosetting resin, for example, epoxy resin is applied. However, there is no limitation to the epoxy resin, and other thermosetting resin may also be applied. Further, instead of the thermosetting resin, thermoplastic resin may be applied. As the thermoplastic resin, for example, there is polyetheretherketone (PEEK), polyetherketoneketone (PEKK), polyphenylene sulfide (PPS), or the like.

As shown in FIGS. 1 and 2, the gap material 22 is disposed in a gap which is formed by the plurality of fiber sheets 20. The gap material 22 is formed in, for example, a wedge shape (a triangular shape) in a cross section orthogonal to the longitudinal direction of the pultrusion material 10. The gap material 22 is formed by combining and integrating gap reinforcement fibers 24 and a gap fiber sheet 26 with each other. As the gap reinforcement fibers 24, for example, carbon fibers are applied, and the gap reinforcement fibers 24 are the same as the reinforcement fibers which are included in the fiber sheet 20. The fiber direction of the gap reinforcement fiber 24 is the same direction as the longitudinal direction of the pultrusion material 10. The gap fiber sheet 26 is a fiber sheet which includes reinforcement fibers having a fiber direction different from the longitudinal direction. For the gap fiber sheet 26, for example, a fiber sheet is used in which a plurality of layers of reinforcement fibers oriented in a predetermined fiber direction are laminated and fiber directions are multi-directional such that the fiber directions in the respective layers are different from each other, and the gap fiber sheet 26 is the same fiber sheet as the fiber sheet 20. The gap fiber sheet 26 is not limited to that described above, and for example, a nonwoven fabric such as felt in which short fibers are entangled (in random directions) may be applied.

Specifically, the gap reinforcement fibers 24 are provided so as to be in contact with one surface of the gap fiber sheet 26, and in this state, the gap fiber sheet 26 is rolled inwardly and bent spirally, whereby the gap material 22 is formed in a wedge shape in a cross section. In the gap material 22 formed in this manner, the gap reinforcement fibers 24 are provided to be evenly distributed in a cross section of the pultrusion material 10, which is orthogonal to the longitudinal direction.

Next, a pultrusion device 100 will be described with reference to FIG. 3. The pultrusion device 100 is a device for forming the pultrusion material 10 while drawing the pultrusion material 10 in a drawing direction. At this time, the drawing direction is the same direction as the longitudinal direction of the pultrusion material 10.

As shown in FIG. 3, the pultrusion device 100 includes a plurality of fiber sheet supply units 110, a plurality of resin pools 112, a gap material supply unit 124, and a molding tool 140.

The fiber sheet supply unit 110 is for supplying the fiber sheet 20 toward the molding tool 140. The fiber sheet supply unit 110 feeds out the fiber sheet 20 in a wound and dry state (that is, a state where the fiber sheet 20 is not impregnated with thermosetting resin). Here, the fiber sheet supply unit 110 is appropriately installed by the number of fiber sheets 20 which are used for the pultrusion material 10 to be formed. However, as the fiber sheet 20 which is fed out by the fiber sheet supply unit 110, a fiber sheet (a prepreg or the like) already impregnated with resin may be used.

The resin pool 112 is a pool which stores thermosetting resin, and a plurality of resin pools 112 are provided according to the number of fiber sheet supply units 110. The resin pool 112 impregnates the fiber sheet fed out from the fiber sheet supply unit 110 with thermosetting resin to make the fiber sheet 20 be in a wet state (that is, a state of being impregnated with the thermosetting resin). However, in a case where the fiber sheet 20 which is fed out by the fiber sheet supply unit 110 is a fiber sheet (a prepreg or the like) already impregnated with resin, the fiber sheet 20 is directly supplied from the fiber sheet supply unit 110 to the molding tool 140.

The gap material supply unit 124 is for supplying the gap material 22 made by integrating the gap reinforcement fibers 24 and the gap fiber sheet 26 with each other toward the molding tool 140. As shown in FIG. 4, the gap material supply unit 124 includes a gap fiber sheet supply unit 141, a gap reinforcement fiber supply unit 142, a plurality of gap resin pools 143, and a preliminary molding tool 144.

The gap fiber sheet supply unit 141 has the same configuration as the fiber sheet supply unit 110 and is for supplying the gap fiber sheet 26 toward the preliminary molding tool 144. The gap fiber sheet supply unit 141 feeds out the gap fiber sheet 26 being in a dry state and wound in a roll.

The gap reinforcement fiber supply unit 142 is for supplying the gap reinforcement fibers 24 toward the preliminary molding tool 144. The gap reinforcement fiber supply unit 142 feeds out a plurality of gap reinforcement fibers 24 being in a dry state and wound in a roll.

The gap resin pool 143 is a pool which stores thermosetting resin, similar to the resin pool 112, and a plurality of gap resin pools 143 are provided according to the number of gap fiber sheet supply units 141 and the number of gap reinforcement fiber supply units 142. The gap resin pool 143 impregnates the gap fiber sheet 26 fed out from the gap fiber sheet supply unit 141 and the gap reinforcement fibers 24 fed out from the gap reinforcement fiber supply unit 142 with the thermosetting resin, thereby making the gap fiber sheet 26 and the gap reinforcement fibers 24 be in a wet state (that is, a state of being impregnated with the thermosetting resin).

In the preliminary molding tool 144, the gap fiber sheet 26 and the gap reinforcement fibers 24 in a wet state are drawn along the drawing direction, whereby the gap material 22 is preliminarily molded. The preliminary molding tool 144 has a heating part (not shown) and thermally cures the thermosetting resin included in the gap fiber sheet 26 and the gap reinforcement fibers 24 in a wet state, thereby forming the gap material 22 as an intermediary body.

Here, as shown in FIG. 5, on the inlet side of the preliminary molding tool 144, the gap reinforcement fibers 24 are disposed so as to be in contact with one surface of the gap fiber sheet 26, and the gap fiber sheet 26 in a state where the gap reinforcement fibers 24 are in contact with one surface thereof is rolled inwardly and bent spirally and is introduced into the preliminary molding tool 144. Then, the preliminary molding tool 144 preliminarily molds the gap material 22 having the cross-sectional shape shown in FIG. 2 and supplies the preliminarily molded gap material 22 toward the molding tool 140.

As shown in FIG. 3, in the molding tool 140, the fiber sheet 20 in a wet state and the gap material 22 are drawing along the drawing direction, whereby the pultrusion material 10 shown in FIG. 1 is formed. The molding tool 140 has a heating part (not shown), similar to the preliminary molding tool 144, and forms the pultrusion material 10 by thermally curing the thermosetting resin which is included in the fiber sheet in a wet state and thermally curing the unreacted thermosetting resin which is included in the gap material 22.

Next, a series of operations relating to a pultrusion method for the pultrusion material 10 using the pultrusion device 100 described above will be described with reference to FIG. 6. As shown in FIG. 6, in the pultrusion method, an impregnation step S1, a gap material preliminary molding step S2, and a pultrusion step S3 are performed in order.

In the impregnation step S1, the fiber sheet 20 in a dry state fed out from the fiber sheet supply unit 110 is immersed in the resin pool 112, so that the fiber sheet 20 is impregnated with thermosetting resin. However, in a case where the fiber sheet 20 which is fed out from the fiber sheet supply unit 110 is a fiber sheet (a prepreg or the like) already impregnated with resin, the impregnation step S1 in the fiber sheet 20 is omitted. Further, in the impregnation step S1, the gap fiber sheet 26 in a dry state fed out from the gap fiber sheet supply unit 141 is immersed in the gap resin pool 143, so that the gap fiber sheet 26 is impregnated with thermosetting resin. Further, in the impregnation step S1, the gap reinforcement fibers 24 in a dry state fed out from the gap reinforcement fiber supply unit 142 are immersed in the gap resin pool 143, so that the gap reinforcement fibers 24 are impregnated with thermosetting resin.

In the gap material preliminary molding step S2, the gap fiber sheet 26 in a wet state and the plurality of gap reinforcement fibers 24 in a wet state are guided to the preliminary molding tool 144 while being drawn in the drawing direction. At this time, the gap fiber sheet 26 and the plurality of gap reinforcement fibers 24 are bent and deformed so as to form a wedge-shaped cross section, and are introduced into the preliminary molding tool 144. Then, in the gap material preliminary molding step S2, the gap material 22 is preliminarily molded by curing the thermosetting resin included in the gap fiber sheet 26 and the gap reinforcement fibers 24 while drawing the gap fiber sheet 26 and the gap reinforcement fibers 24 introduced into the preliminary molding tool 144 in the drawing direction.

In the pultrusion step S3, the fiber sheet 20 in a wet state and the preliminarily molded gap material 22 are guided to the molding tool 140 while being drawn in the drawing direction. At this time, the fiber sheet 20 and the gap material 22 are bent and deformed such that the T-shaped pultrusion material 10 is obtained, and are introduced into the molding tool 140. Then, in the pultrusion step S3, the T-shaped pultrusion material 10 is formed by curing the thermosetting resin included in the fiber sheet 20 and the gap material 22 while drawing the fiber sheet 20 and the gap material 22 introduced into the molding tool 140 in the drawing direction.

As described above, according to Embodiment 1, the gap material 22 includes the gap fiber sheet 26 in addition to the gap reinforcement fibers 24, and therefore, even in a case where a load acts in a direction in which the gap reinforcement fibers 24 are separated from each other, the reinforcement fibers included in the gap fiber sheet 26 provides drag, so that the gap material 22 can be reinforced. Accordingly, the strength of the gap material against the load can be improved, and therefore, occurrence of a defect such as cracking can be suppressed.

Further, according to Embodiment 1, the gap reinforcement fibers 24 are evenly distributed in the cross section of the gap material 22, so that the uneven distribution of the gap reinforcement fibers 24 can be suppressed, and therefore, it is possible to suppress the gap reinforcement fibers 24 from being adjacent to each other and suppress occurrence of a defect between the gap reinforcement fibers 24.

Further, according to Embodiment 1, the gap fiber sheet 26 in which the gap reinforcement fibers 24 are in contact with one surface thereof is rolled and bent spirally, whereby the gap reinforcement fibers 24 can be disposed to be easily and evenly distributed in the cross section of the gap material 22, which is orthogonal to the drawing direction.

Embodiment 2

Figure 7:
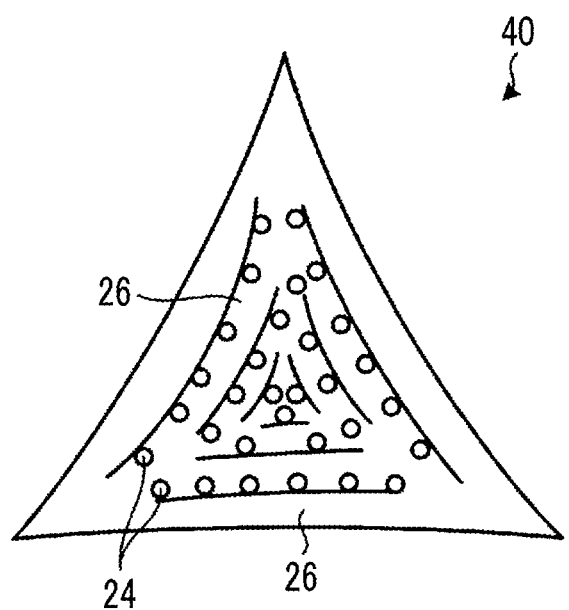
FIG. 7 is a sectional view schematically showing a gap material which is provided in a composite material member according to Embodiment 2.
Figure 8:
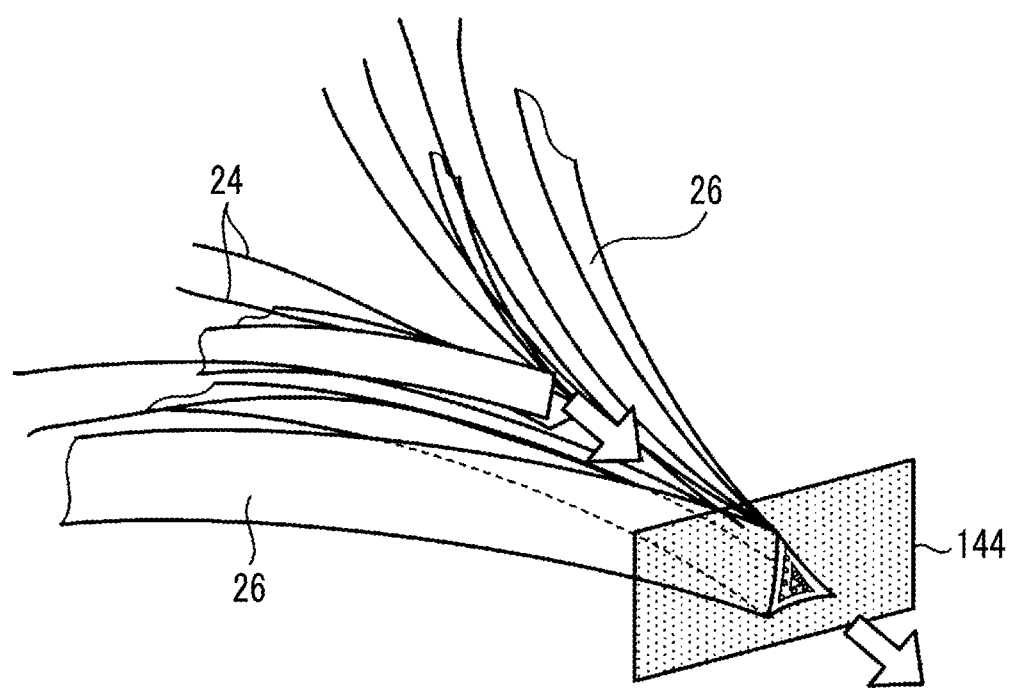
FIG. 8 is a schematic configuration diagram showing the surroundings of a preliminary molding tool of a pultrusion device according to Embodiment 2.

Next, a gap material 40 which is provided in a pultrusion material 10 according to Embodiment 2 will be described with reference to FIGS. 7 and 8. In Embodiment 2, in order to avoid overlapping description, portions different from those in Embodiment 1 will be described, and portions having the same configurations as those in Embodiment 1 will be described with the same reference numerals applied thereto. FIG. 7 is a sectional view schematically showing a gap material which is provided in a composite material member according to Embodiment 2. FIG. 8 is a schematic configuration diagram showing the surroundings of a preliminary molding tool of a pultrusion device according to Embodiment 2.

The gap material 40 of Embodiment 2 is formed by combining and integrating the gap reinforcement fibers 24 and the gap fiber sheet 26 with each other. The gap reinforcement fibers 24 and the gap fiber sheet 26 are the same as those in Embodiment 1, and therefore, description thereof is omitted. Specifically, the gap material 40 is formed in a wedge shape in a cross section by laminating a plurality of gap fiber sheets 26 and disposing the gap reinforcement fibers 24 between the layers of the laminated gap fiber sheets 26. In the gap material 40 formed in this manner, the gap reinforcement fibers 24 are provided to be evenly distributed in a cross section of the pultrusion material 10, which is orthogonal to the longitudinal direction.

Then, in the gap material preliminary molding step S2, the plurality of gap fiber sheet 26 in a wet state and the plurality of gap reinforcement fibers 24 in a wet state are guided to the preliminary molding tool 144 while being drawn in the drawing direction. At this time, the gap fiber sheets 26 and the gap reinforcement fibers 24 are introduced into the preliminary molding tool 144 such that the plurality of gap fiber sheets 26 are laminated so as to form a wedge-shaped cross section and the gap reinforcement fibers 24 are disposed between the layers of the laminated gap fiber sheets 26. Then, in the gap material preliminary molding step S2, the gap material 40 is preliminarily molded by curing the thermosetting resin included in the gap fiber sheets 26 and the gap reinforcement fibers 24 while drawing the plurality of gap fiber sheets 26 and the plurality of gap reinforcement fibers 24 introduced into the preliminary molding tool 144 in the drawing direction.

As described above, according to Embodiment 2, the gap reinforcement fibers 24 are disposed between the layers of the laminated gap fiber sheets 26, whereby the gap reinforcement fibers 24 can be disposed to be easily and evenly distributed in the cross section of the gap material 40, which is orthogonal to the drawing direction.

In Embodiments 1 and 2, the pultrusion material 10 is configured to include the plurality of fiber sheets 20 and the gap material 22. However, there is no limitation to this configuration, and it may be configured to further include reinforcement fibers. Specifically, as the reinforcement fibers, reinforcement fibers having a fiber direction in the drawing direction (the longitudinal direction) may be used as reinforcement fibers for reinforcement and disposed at a predetermined site of the pultrusion material 10. At this time, the reinforcement fibers for reinforcement may be provided to be combined with the fiber sheet 20 or may be provided in the outermost layer, and may be provided in any form.

REFERENCE SIGNS LIST

- 10: pultrusion material
- 20: fiber sheet
- 22: gap material
- 24: gap reinforcement fiber
- 26: gap fiber sheet
- 40: gap material (Embodiment 2)
- 100: pultrusion device
- 110: fiber sheet supply unit
- 112: resin pool
- 124: gap material supply unit
- 140: molding tool
- 141: gap fiber sheet supply unit
- 142: gap reinforcement fiber supply unit
- 143: gap resin pool
- 144: preliminary molding tool

The invention claimed is:

1. A composite material member comprising:
a plurality of fiber sheets extending along a longitudinal direction; and
a gap material which is provided in a gap formed by the plurality of fiber sheets, wherein
the gap material has a wedge shape in a cross section cut in a plane orthogonal to the longitudinal direction and includes
 a gap fiber sheet which includes reinforcement fibers oriented in a first fiber direction different from the longitudinal direction, and
 gap reinforcement fibers oriented in a second fiber direction which is the same as the longitudinal direction, the gap reinforcement fibers being arranged evenly spaced along and with respect to only one side of the gap fiber sheet,
the gap reinforcement fibers are in contact with at least one surface of the gap fiber sheet, and
in the gap material, the gap fiber sheet in a state where the gap reinforcement fibers are in contact with the at least one surface of the gap fiber sheet is bent spirally.

2. The composite material member according to claim 1, wherein the gap reinforcement fibers are evenly distributed in the cross section of the gap material, which is orthogonal to the longitudinal direction.

3. A composite material member, comprising:
a plurality of fiber sheets extending along a longitudinal direction; and
a gap material which is provided in a gap formed by the plurality of fiber sheets, wherein the gap material has a wedge shape in a cross section cut in a plane orthogonal to the longitudinal direction and includes
a plurality of gap fiber sheets each including reinforcement fibers oriented in a first fiber direction different from the longitudinal direction, and
gap reinforcement fibers oriented in a second fiber direction which is the same as the longitudinal direction, the gap reinforcement fibers being arranged evenly spaced along and with respect to only one side of each gap fiber sheet, and
in the gap material, the plurality of gap fiber sheets are laminated and the gap reinforcement fibers are disposed between layers of the laminated gap fiber sheets.

4. A gap material which is provided in a gap of a composite material member formed by a plurality of fiber sheets extending along a longitudinal direction,
the gap material having a wedge shape in a cross section cut in a plane orthogonal to the longitudinal direction and comprising
 a gap fiber sheet which includes reinforcement fibers oriented in a first fiber direction different from the longitudinal direction; and
 gap reinforcement fibers oriented in a second fiber direction which is the same as the longitudinal direction, the gap reinforcement fibers being arranged evenly spaced along and with respect to only one side of the gap fiber sheet, wherein
the gap reinforcement fibers are in contact with at least one surface of the gap fiber sheet, and
in the gap material, the gap fiber sheet in a state where the gap reinforcement fibers are in contact with the at least one surface of the gap fiber sheet is bent spirally.

5. A pultrusion method of pultruding a composite material member while drawing a plurality of fiber sheets in a drawing direction, the pultrusion method comprising:
a gap material preliminary molding step of preliminarily molding a gap material which is provided in a gap formed by the plurality of fiber sheets which is drawn in the drawing direction,
wherein the gap material has a wedge shape in a cross section cut in a plane orthogonal to the drawing direction and includes
 a gap fiber sheet which includes reinforcement fibers oriented in a first fiber direction different from the drawing direction, and
 gap reinforcement fibers oriented in a second fiber direction which is the same as the drawing direction, the gap reinforcement fibers being arranged evenly spaced along and with respect to only one side of the gap fiber sheet, and
wherein the gap material preliminary molding step includes:
 supplying the gap reinforcement fibers toward a preliminary molding tool while supplying the gap fiber sheet toward the preliminary molding tool,
 disposing the gap reinforcement fibers so as to be in contact with one surface of the gap fiber sheet,
 inwardly rolling and spirally bending the gap fiber sheet in a state where the gap reinforcement fibers are in contact with the one surface of the gap fiber sheet, so as to introduce the gap fiber sheet into the preliminary molding tool, and
 drawing the gap reinforcement fibers and the gap fiber sheet along the drawing direction, whereby the gap material is preliminarily molded.

6. A pultrusion method of pultruding a composite material member while drawing a plurality of fiber sheets in a drawing direction, the pultrusion method comprising:
a gap material preliminary molding step of preliminarily molding a gap material which is provided in a gap formed by the plurality of fiber sheets which is drawn in the drawing direction,
wherein the gap material has a wedge shape in a cross section cut in a plane orthogonal to the drawing direction and includes
 a plurality of gap fiber sheets each including reinforcement fibers oriented in a first fiber direction different from the drawing direction, and
 gap reinforcement fibers oriented in a second fiber direction which is the same as the drawing direction, the gap reinforcement fibers being arranged evenly spaced along and with respect to only one side of each gap fiber sheet, and wherein the gap material preliminary molding step includes:

supplying the gap reinforcement fibers toward a preliminary molding tool while supplying the gap fiber sheets toward the preliminary molding tool, and preliminarily molding the gap material by laminating the gap fiber sheets, disposing the gap reinforcement fibers between layers of the laminated gap fiber sheets, and drawing the laminated gap fiber sheets having the gap reinforcement fibers disposed therebetween introduced into the preliminary molding tool along the drawing direction.

7. A gap material which is provided in a gap of a composite material member formed by a plurality of fiber sheets extending along a longitudinal direction, the gap material having a wedge shape in a cross section cut in a plane orthogonal to the longitudinal direction and comprising a plurality of gap fiber sheets each including reinforcement fibers oriented in a first fiber direction different from the longitudinal direction, and gap reinforcement fibers oriented in a second fiber direction which is the same as the longitudinal direction, the gap reinforcement fibers being arranged evenly spaced along and with respect to only one side of each gap fiber sheet, wherein in the gap material, the plurality of gap fiber sheets are laminated and the gap reinforcement fibers are disposed between layers of the laminated gap fiber sheets.

* * * * *